UNITED STATES PATENT OFFICE.

JOHN RANALD, OF LONDON, ENGLAND.

PROCESS OF EXTRACTING BISMUTH FROM ORES CONTAINING BISMUTH OXIDS, &c.

SPECIFICATION forming part of Letters Patent No. 657,030, dated August 28, 1900.

Application filed October 2, 1899. Serial No. 732,375. (No specimens.)

*To all whom it may concern:*

Be it known that I, JOHN RANALD, gentleman, a subject of the Queen of Great Britain and Ireland, residing at 62 Streatham Hill, London, England, have invented certain new and useful improvements in the extraction of bismuth from ores containing bismuth oxid or bismuth oxid and sulfid and in converting ferrous chlorid into ferric chlorid; and I do hereby declare the following to be a full, clear, and exact description of the invention, such as will enable others skilled in the art to which it appertains to make and use the same.

The object of my present invention is principally to extract bismuth from ores containing bismuth oxid or bismuth oxid and sulfid in an economical and efficient manner.

The material to be treated is finely divided, which may be done by crushing it and passing it through a sieve of, say, about thirty meshes to the square inch. The material is then in calculated amount introduced into vats containing a heated solution of ferric chlorid of moderate density—such, for example, as a density of 1240 (as against water at 1000)—and maintained at a temperature at or about boiling-point. No parts of the vat or apparatus which come in contact with the heated ferric-chlorid solution should present a surface of iron to the solution. The heating of the solution may be effected in any convenient way. The bismuth is extracted as bismuth trichlorid thus:

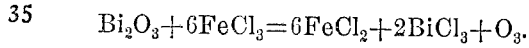

The oxychlorid of bismuth is not formed in the presence of ferrous chlorid if ferric chlorid of sufficiently-high specific gravity be used in the first place. The liquor, consisting of chlorids of iron and bismuth, is separated from the tailings by siphoning or otherwise, and while it is still at a high temperature it is treated with iron, (recovered, as hereinafter described,) whereby the bismuth is precipitated in a chemically-pure state, the solution being ferrous chlorid, which is removed, and the bismuth is melted and run into molds or the like, wherein it assumes the crystalline state. The ferrous chlorid is then oxidized to ferric chlorid, which can be done by electrolytic means—for example, in a cell with the anode in a compartment separated by a porous diaphragm from the cathode-compartment. Ferric chlorid forms at the anode and iron is deposited at the cathode, and these can be used again in the process, and so the process can be carried on continuously, the same iron and solvent being used repeatedly in the treatment of further charges of material. Or instead of employing electrolytic means I can add potassium chlorate to the hot ferrous-chlorid liquor, and this will effect the conversion of the ferrous chlorid to ferric chlorid. This takes place in accordance with the following equation:

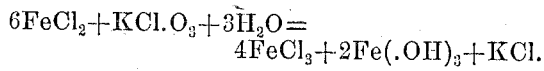

From this the amount of potassium chlorate to be used is readily calculated. While it is preferable to add the potassium chlorate to the ferrous-chlorid liquid while the latter is hot, it may be added to cold ferrous-chlorid liquid with the same result.

The process is best carried out in the vat or vessel in which the ferric-chlorid liquor is required—that is, the vat or vessel in which the ore is to be treated. The potassium chlorate should be added by degrees, and it is advisable to add an amount slightly under the calculated full quantity in order to avoid the possibility of free chlorin being generated. At the same time separation of ferric hydrate may take place, and this can either be separated or be converted into ferric chlorid by the addition of hydrochloric acid in amount calculated from the foregoing and following equations:

This method of conversion of ferrous chlorid into ferric chlorid can also be applied in the conversion into ferric chlorid of the ferrous chlorid obtained in the treatment of bismuth and antimony sulfid ores, according to the specification of my application for patent, Serial No. 716,124. The tailings in the first or solvent vat can be treated or utilized in any desired way, and if there be any valuable constituents—such, for example, as gold—present they can be recovered from the tailings by any usual or suitable means.

Having now particularly described and ascertained the nature of this invention and in what manner the same is to be performed, I declare that what I claim is—

1. The process of extracting bismuth from ores containing bismuth oxid or bismuth oxid and sulfid, said process consisting in subjecting crushed ore to the action of a solution of ferric chlorid at about boiling temperature, then precipitating the bismuth by means of iron, and then oxidizing the resulting ferrous chlorid to transform it into ferric chlorid.

2. The process of extracting bismuth from ores containing bismuth oxid or bismuth oxid and sulfid, said process consisting in subjecting crushed ore to the action of a solution of ferric chlorid at about boiling temperature, then precipitating the bismuth by means of iron, and then treating the resulting ferrous chlorid with potassium chlorate for converting it into ferric chlorid.

3. The process of extracting bismuth from ores containing bismuth oxid or bismuth oxid and sulfid, said process consisting in subjecting crushed ore to the action of a solution of ferric chlorid at about boiling temperature, then precipitating the bismuth by means of iron, then treating the resulting ferrous chlorid with potassium chlorate and finally separating the ferric hydrate which forms.

4. The process of extracting bismuth from ores containing bismuth oxid or bismuth oxid and sulfid, said process consisting in subjecting crushed ore to the action of a solution of ferric chlorid at about boiling temperature, then precipitating the bismuth by means of iron, then treating the resulting ferrous chlorid with potassium chlorate, and finally converting the ferric hydrate which forms into ferric chlorid by means of hydrochloric acid.

In testimony whereof I have signed my name to this specification in the presence of two subscribing witnesses.

JOHN RANALD.

Witnesses:
A. D. JAMESON,
T. L. RAND.